United States Patent [19]

Blattermann et al.

[11] 3,939,965
[45] Feb. 24, 1976

[54] CONVEYOR BELT

[75] Inventors: Karl-Günther Blattermann, Hamburg-Rahlstedt; Günther Nolte, Mannheim, both of Germany

[73] Assignee: Conrad Scholtz AG, Hamburg, Germany

[22] Filed: Apr. 17, 1974

[21] Appl. No.: 461,808

[30] Foreign Application Priority Data

Apr. 17, 1973  Germany............................ 2319480

[52] U.S. Cl................................. 198/198; 198/193
[51] Int. Cl.²....................................... B65G 15/42
[58] Field of Search.................... 198/193, 198, 199

[56] References Cited
UNITED STATES PATENTS

| | | | |
|---|---|---|---|
| 1,405,571 | 2/1922 | Davis | 198/198 X |
| 1,547,276 | 7/1925 | Wentz | 198/199 |
| 1,590,883 | 6/1926 | Bryant | 198/199 |
| 2,303,762 | 1/1942 | Reimel et al. | 198/198 |
| 2,784,835 | 3/1957 | Dixon | 198/198 |
| 2,880,128 | 3/1959 | Fink | 198/198 |
| 2,909,271 | 10/1959 | Taylor | 198/198 |
| 2,922,645 | 1/1960 | Hurlbut | 198/198 X |
| 2,925,165 | 2/1960 | Rake | 198/198 |
| 3,237,757 | 3/1966 | Perkins | 198/198 |

FOREIGN PATENTS OR APPLICATIONS

| | | | |
|---|---|---|---|
| 1,024,428 | 2/1958 | Germany | 198/198 |
| 1,194,320 | 6/1965 | Germany | 198/193 |
| 832,292 | 1/1970 | Canada | 198/193 |
| 235,670 | 9/1960 | Australia | 198/198 |

*Primary Examiner*—Evon C. Blunk
*Assistant Examiner*—Richard K. Thomson
*Attorney, Agent, or Firm*—Burns, Doane, Swecker & Mathis

[57] ABSTRACT

An endless conveyor belt for the conveying of separate articles or packages to be conveyed along a steep incline. The belt is formed with spaced, resilient flaps which extend upwardly from the load supporting surface to engage the conveyed article. If the article slides backwardly on the belt, the flap bends and pivots upwardly so that a roughened surface will tend to retard the sliding movement. After the article is removed, the flap is restored to a position within a recess in the belt surface during the return run.

11 Claims, 5 Drawing Figures

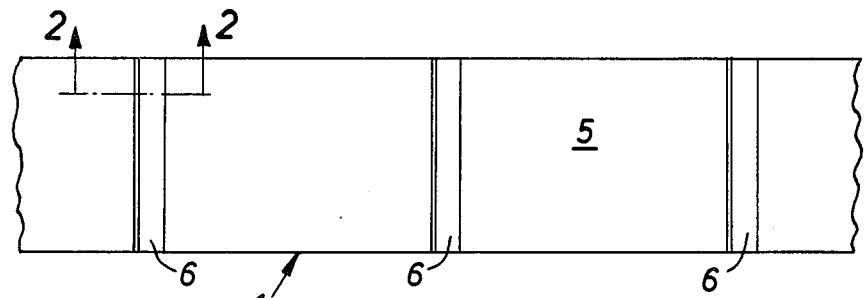
Fig.1
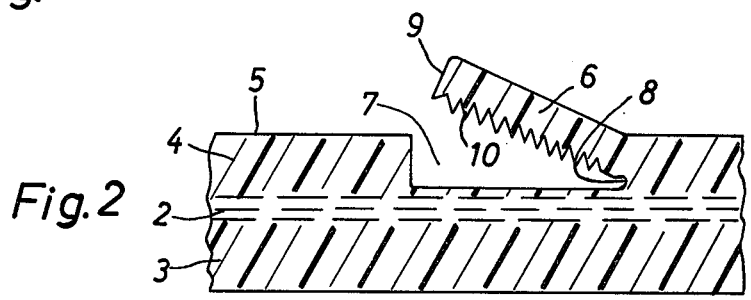
Fig.2
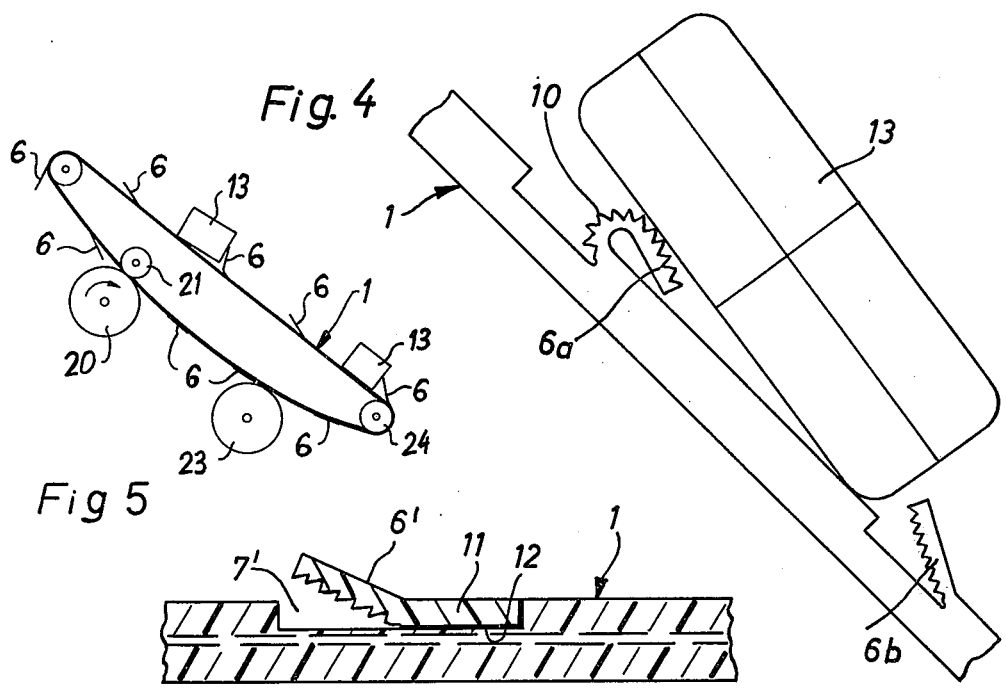
Fig. 4
Fig 5
Fig 3

CONVEYOR BELT

The invention relates to an endless conveyor belt for conveying articles along a steep incline, the belt being of a novel construction, having transverse article engaging members which project above the load support surface of the conveyor belt by varying amounts depending on the loading and which are restored after the article is removed.

Conveyor belts with driver bars and more particularly transverse bars of different shapes are known. The possible angle of conveying inclination is increased by such bars, as compared with conveyor belts which have a smooth supporting surface. Known conveyor belts with driver bars permit angles of inclinations of up to 35° to 45°, in some cases even up to 50°, when conveying articles. Increasing angles of inclinations render the correct transfer, especially of large articles, increasingly difficult in the sense of such articles being reliably gripped and conveyed by the steep conveyor belt.

It is an object of the invention to provide a relatively simply constructed conveyor belt for conveying articles up a gradient, which will permit even large articles to be conveyed at very steep angles of inclination, above 45°, with reliability.

According to the present invention, a conveyor belt for conveying articles up a steep incline, has transverse article engaging members which preferably are constructed as strip-like flaps pivoted at their trailing edges to the load supporting face of the belt and are resiliently biased into inoperative positions in which their leading edges are either flush with or project slightly from the load supporting face of the belt, each such flap being movable pivotally or foldable about its trailing edge against the action of the biasing force and in the rearward direction with respect to the direction of travel of the belt.

With the conveyor belt according to the invention it is possible to convey even large articles reliably up very steep conveying runs without any special difficulties militating against correct transfer. A downwardly moving article that cannot be retained by the first transverse flap with which it comes into contact, pivots or folds the said transverse flap against its restoring force in the direction opposite to the running direction of the conveyor belt. The article is substantially checked by the backwardly pivoted or folded transverse flap and is slowly transferred to the succeeding transverse flap which then reliably entrains the article owing to its having a much lower velocity relative to the conveyor belt.

In order to increase the braking effect of the backwardly pivoted or folded transverse flaps still further, the said transverse flaps are advantageously provided with retention serrations on their lower flat sides which face inwardly towards the conveyor belt when in the inoperative position.

All conveyor belts with driver bars on the support surface suffer from the disadvantage that the presence of such bars prevents the use of conventional simple idler rollers for guiding the bottom or return run of the conveyor belt, so that special constructions are required for this purpose. The conveyor belt according to the invention achieves a substantial improvement in the sense that the transverse flaps when in their inoperative position are able to lie almost flat on the load support surface of the conveyor belt, and are pivoted or folded into a steeper position, in which they project further beyond the support surface, only in the article loading zone of the upper belt run or under the load of conveyed articles.

Guiding the bottom belt run with the transverse flaps in their inoperative position is substantially simpler than in conveyor belts with known, immovable driver bars. Guiding of the bottom run becomes particularly simple if the transverse flaps are disposed substantially within recesses of the outer covering stratum of the conveyor belt, the dimensions of said recesses being adapted to those of the transverse flaps in such a way that the latter are able to sink completely into their recesses.

Guiding constructions with simple idlers, of the kind used for known conveyor belts with a smooth support surface, can be used to provide guiding of the bottom run of a conveyor belt constructed in this manner according to the invention. The transverse flaps, which in their inoperative positions normally project slightly from the recesses for gripping the conveyed material, may be pressed into their recesses by the idlers for the bottom run so that the conveyor belt is able to run over the idlers in the same way as known smooth conveyor belts. Operation becomes particularly smooth if the thickness of the transverse flaps is exactly equal to the depth of the recesses so that the top flat side of each transverse flap is in precise and flush alignment with the remaining support surface of the conveyor belt when the transverse flaps are fully depressed into the recesses. In addition to enabling vibration-free guiding to be achieved in the bottom run by simple guide means, the retractable transverse flaps offer the additional advantage of permitting unobstructed reversal of the bottom run of the conveyor belt over troughed idlers.

Other objects of the invention will be apparent from the claims and from the description when read in conjunction with the appended drawing wherein:

FIG. 1 is a plan view of a length of an endless conveyor belt embodying the invention;

FIG. 2 is a fragmentary elevation in section along the line 2—2 of FIG. 1;

FIG. 3 is an elevation similar to that shown in FIG. 2 of a second embodiment according to the invention;

FIG. 4 is a side view to an enlarged scale of the conveyor belt of FIGS. 1 and 2; and FIG. 5 is a diagrammatic view of apparatus employing the belt of the present invention.

The conveyor belt illustrated in FIGS. 1 and 2 is basically constructed in a conventional manner with a fabric core 2, a covering stratum 3 of rubber on the running (inner) side and a covering stratum 4 of rubber on the load supporting (outer) side. The surface of the covering stratum 4 forms the load supporting surface 5 of the conveyor belt. The covering stratum 3 can be omitted or a suitable alternative substituted.

A plurality of transverse flaps 6, each of which is shown to extend over the entire width of the conveyor belt, are provided on the load supporting surface of the conveyor belt 1 and may be equally spaced apart from one another in the longitudinal direction of the conveyor belt, for example at a spacing of 250 mm. The flaps 6 extend each at an angle generally perpendicular to the longitudinal direction of the conveyor belt 1. Each transverse flap 6 may be conveniently constructed in the form of a strip-like flap of an approximately flat, rectangular cross section and made of the same material as the covering stratum 4. Each flap 6 has a width as measured in the running direction of belt 1 of, for example 20 mm.

The transverse flaps 6 are normally arranged at regular spacings and extend approximately at right angles to the length of the conveyor belt. This provides the best possible utilization of their entrainment capacity. The transverse flaps 6 may, however, also be disposed at an angle other than 90° in relation to the belt length. This achieves a particularly high degree of smooth running in the bottom belt run because each transverse flap comes into contact with the idlers of the bottom run gradually and with a point of contact that travels over the width of the conveyor belt, instead of coming into contact suddenly over the full length of the said flap.

A recess 7, also of approximately flat rectangular cross section, may be formed in the covering stratum 4 under each transverse flap and in the same orientation as the said flap. The trailing edge of each transverse flap may merge semalessly seamlessly the covering stratum 4 in the region 8 which is the rear side wall of the recess 7 in the running direction of the conveyor belt. The transverse flaps 6 are thus integral with the convering stratum 4 so that when unloaded, each flap assumes an inoperative position. The inoperative position as illustrated in FIG. 2 contemplates that when unloaded, each flap will form an angle of perhaps 25° with the load supporting surface 5 of the conveyor belt. This angle is open in the running direction so that the leading edge 9 of the flap projects slightly above the load supporting surface 5 of the conveyor belt.

The dimensions of the transverse flaps 6 and the recesses 7 are desirably adapted to each other so that the transverse flaps are able to sink completely into the recesses for the return run, as discussed above. With the flap inserted completely into recess 7, the thickness of the said transverse flaps should correspond precisely to the depth of the recesses. If flaps 6 and recesses 7 are matched, it is possible, as shown in FIG. 5, for the flap 6 to be placed in recess 7 by rollers 20 and 21 on the return run and stay in the recesses 7 as the belt passes idler 23 and around end roller 24.

The inner flat side of each transverse flap 6, which in the inoperative position faces the floor of the recess, is provided with retention serrations 10 which extend across the belt and along the length of the flap 6 to provide an increased frictional engagement with the conveyed articles.

On the other hand, flap 6 may be formed to have a resilient restoring force that will cause flap 6 to project upwardly at an angle somewhat less than the angle illustrated in FIG. 2. By changing the direction of the belt 1 at the article loading areas, as by passing the belt around a roller 24 having a relatively small diameter, the leading edge of flap 6 will temporarily project upwardly and engage the article 13 at the loading zone. As pointed out above, this construction can simplify the handling of the belt during its downward return run, and still assure that the leading edge 9 of flap 6 will be sufficiently elevated to engage the article.

FIG. 3 shows a second embodiment of the invention in which the transverse flaps 6' which may be of a different, flexible and resilient material produced separately from the conveyor belt. The rear edge of flaps 6' have a tab 11 that is suitably secured as by cold- or hot-vulcanizing or by an adhesive at their bottom flat sides 12 onto the floors of prepared recesses 7'. The width of each recess 7' in the longitudinal direction of the conveyor belt is preferably somewhat greater than that of the recesses 7 and corresponds to the width of the transverse flap 6' increased by the tab section 11. Such a construction offers the possibility of the replacement of damaged or inoperative flaps 6'.

The method of operation of a conveyor belt according to the invention is explained with reference to FIG. 4. An article such as a box 13 is delivered onto the conveyor belt 1 such as by a feeder belt, not shown. The conveyor belt of the present invention can be directed steeply in the upward direction. If the box cannot be retained by the first transverse flap 6a with which it comes into contact, it will slide against the friction force provided by serrations 10, down over the flap 6a against the upward running direction of the upper run of the conveyor belt. Since the transverse flap 6a is of a flexible and resilient material such as rubber, flap 6a becomes folded rearwardly so that its retaining serrations 10 come into contact with the underside of the box 13 and decelerate the latter substantially. The box 13 is thus slowly transferred to the next lower transverse flap 6b which is in its inoperative position so that the box bears also against the leading edge 9 of the said flap 6b. The transverse flap 6b may also progressively erect itself more steeply against its resilient restoring force as needed, depending on the applied loading. After the box has been discharged, the rearwardly folded transverse flap 6a returns to its unloaded or inoperative position owing to its resilient restoring force.

It has already been mentioned that the transverse flaps 6 normally project from the recesses slightly above the support surface when they are in their inoperative position. To this end, it is best for the flaps to be biased so that in the inoperative position, they tend to lie at an acute angle of about 25° with the plane of the conveyor belt, the said angle being open in the running direction. This construction is advantageous as regards the conveyed articles being correctly gripped, and it is also advantageous with regard to smooth running in the bottom run. However, it is not absolutely essential that the transverse flaps which are disposed in the recesses project slightly above the support surface when they are in their inoperative position. Alternatively, they may be constructed in such a way that their restoring force, or rollers 20 and 21, cause the flaps 6 to be completely returned into the recesses 7 after the conveyed material is released.

After completing the return run, the flaps 6 should emerge from their recesses 7 at the loading zone, as illustrated in FIG. 5. In this case, the conveyed articles are fed onto the conveyor belt in a loading zone where the belt 1 passes around the lower return pulley 24 to ensure that the article or box 13 can be gripped by the transverse flaps 6. In such an arrangement, the lower return pulley 24 should have a relatively small diameter so that the transverse flaps 6 are lifted from the recesses by the necessary amount.

The pivotal or foldable attachment of the transverse flaps can be devised in various ways, for example by means of hinges or lightweight hook connectors. The transverse flaps should be constructed of flexible material and may be fixedly joined to the conveyor belt by means of marginal sections or tabs which are continuous in the direction of the length of the said flaps. The restoring force in such cases is based on the resilient properties of the material of the transverse flaps, and as a rule the material of the covering stratum of the conveyor belt, i.e., rubber or rubber-like plastics, is recommended to be used also for the flaps. The material should be sufficiently flexible to ensure that when a transverse flap is subjected to the load of a conveyed article which slides down over it as already described, the said transverse flap is able to fold back completely about its trailing edge against the running direction of the conveyor belt until the flat outer side of the transverse flap comes into contact with the support surface of the conveyor belt behind the flap. The material must also have good restoring properties.

The transverse flaps which are disposed in the recesses can alternatively be constructed so that they are homogeneous with the material of the covering stratum of the conveyor belt, i.e., they can be constructed integrally with the covering stratum and thereby joined to the conveyor belt. Separate, subsequent attachment of the transverse flaps on the conveyor belt is then no longer necessary since they are produced together with the conveyor belt as integral components thereof. The advantages of this arrangement include a particularly reliable connection of the transverse flaps with the conveyor belt and, more particularly, very inexpensive manufacture. The belt can be produced, for example, by cutting the transverse flaps in the raw, unvulcanized covering stratum of the conveyor belt, and then vulcanizing the whole conveyor belt complete with the flaps by the use of suitable press tools which, where appropriate, impart to the transverse flaps the desired angle of inclination of their inoperative position and also provide the retaining serrations on the inner flat side of each flap. The edge of each flap which trails in the running direction of the finished belt will then merge seamlessly with the covering stratum. Furthermore, since the transverse flaps were cut from the covering stratum prior to vulcanizing, they will automatically have a size such that they accurately fit into the recesses.

The transverse flaps may, however, also be produced separately from the conveyor belt, for example in long length by molding or extruding, for joining to existing known finished conveyor belts. To this end, each transverse flap is bonded to the conveyor belt by a marginal tab section which is continuous along the length of the flap, i.e., the tabs are adhesively affixed to the support surface of the conveyor belt or on the floor of a recess which is prepared in the covering stratum, for example by means of cutting out. Conventional cold adhesives can be used for this purpose. The adhesive affixing of prepared transverse flaps enables existing conveyor belts which are already in operation to be subsequently converted into conveyor belts according to the invention, and facilitates the repair of conveyor belts embodying the invention.

To facilitate manufacture, the transverse flaps of a conveyor belt embodying the invention are normally constructed so that together with their recesses they extend over the entire width of the conveyor belt and are all equally spaced in the longitudinal direction of the said conveyor belt. However, this construction is not essential. For example, the transverse flaps and corresponding recesses can also extend over only part of the width of the conveyor belt. In some cases, it may also be advantageous, in the interest of improving the conveying capacity, to provide, in addition to the transverse flaps, a roughened surface on the outer face of the belt, or one whose adhesion has been increased in some other manner.

The present invention may be embodied in other specific forms without departing from the spirit or essential characteristics thereof. The presently disclosed embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and intended to be covered by Letters Patent is:

1. An endless conveyor belt of cords embedded in rubber or plastic for conveying articles up a steep incline, said belt comprising:
    a substantially continuous smooth surface on one side adapted for engagement with guide rolls;
    a load supporting surface on the other side having a plurality of recesses at spaced locations along the length thereof;
    a plurality of article engaging flaps each resiliently attached at its trailing edge to the trailing end of one of said recesses and having an underside and being shaped to fit into said recess to pass over support rolls engaging the load supporting surface;
    each said flap having a volume substantially filling the volume of its corresponding recess when disposed therein and being resiliently biased outwardly at a small acute angle with the load supporting surface of the belt whereby its leading edge normally extends above the load supporting belt surface at a loading zone for engagement with articles to be conveyed;
    said flaps being made of a strip of rubber or plastic material and formed to bend due to loading with the leading edge moving rearwardly in a generally arcuate path to cause the underside of said flap to engage a large article being conveyed.

2. A conveyor belt as claimed in claim 1 wherein the article engaging flap has an upper surface which is on the same side of the belt as the load supporting surface and wherein the underside has article retention serrations, and the flap is attached to said belt for pivotal movement about an axis substantially perpendicular to the running direction of said belt to allow pivotal movement of said leading edge upwardly so that the retention serrations engage the article.

3. A conveyor belt as claimed in claim 2 wherein the article engaging flap is adhesively attached on the conveyor belt.

4. A conveyor belt as claimed in claim 2 wherein the article engaging flap is formed as an integral extension of an upper surface layer of said belt.

5. A conveyor belt as defined in claim 1 wherein the underside of said flap has article retention serrations which, when the flap leading edge is moved rearwardly, engage the underside of the article to resist relative sliding movement of the article along the belt and which, when the flap is folded downwardly, are wholly located within said recess.

6. A conveyor belt as claimed in claim 1 wherein each flap contains a marginal tab which extends continuously along the whole length of the trailing edge of the flap, the under side of each tab being bonded to the conveyor belt to secure the flap to the belt.

7. A conveyor belt as claimed in claim 6 in which the tabs are bonded to the bottoms of the associated recesses.

8. A conveyor belt as claimed in claim 1 in which the said acute angles are approximately 25°.

9. A conveyor belt as claimed in claim 1 in which the flaps are made of resilient material and are joined to the conveyor belt along the entire length of each flap at its trailing edge in a direction perpendicular to the running direction of the belt.

10. A conveyor belt as claimed in claim 1 wherein each flap has an outer surface that is integral and homogeneous with the material of the load supporting surface.

11. A conveyor system for conveying large articles along a path having a steep inclination including:
- a conveyor belt having a load carrying surface on one side and a substantially continuous surface on the opposite side adapted to engage the guide rollers;
- a plurality of guide rollers including an upper roller, a lower roller, and intermediate rollers in contact with said continuous belt surface for defining an endless path for said conveyor belt, said path including a load carrying path portion and a return path portion with at least one belt engaging roller located in return path portion to be in contact with the load carrying surface on said belt;
- said load carrying surface having a plurality of recesses at spaced locations along the length thereof;
- a plurality of article engaging flaps each resiliently attached at its trailing edge to the trailing end of one of said recesses and having an underside and being shaped to fit into said recess to allow a return run of said belt to pass over said belt engaging roller;
- said flap having a volume substantially filling the volume of its corresponding recess when disposed therein and being resiliently biased upwardly at a small acute angle relative to the load carrying surface of said conveyor belt so that a leading edge of the flap will extend above the load carrying belt surface at a loading zone for engagement with articles to be conveyed;
- said flaps being made of a strip of rubber or plastic material and formed to bend due to loading with the leading edge moving rearwardly in a generally arcuate path to cause the underside of said flap to engage an oversized article being conveyed; and
- means on the underside of said flap being formed to resist relative sliding movement with said article.

* * * * *